April 24, 1928.

H. M. RYDER ET AL 1,667,270

LIQUID METER

Filed March 16, 1927

Inventor
Harry Moyer Ryder
Leon J. Bailey
By their Attorneys
Williams & Morse

Patented Apr. 24, 1928.

1,667,270

UNITED STATES PATENT OFFICE.

HARRY MOYER RYDER AND LEON J. BAILEY, OF BRADFORD, PENNSYLVANIA, ASSIGNORS TO PETROLEUM RECLAMATION CORPORATION, OF NEW YORK, N. Y., A CORPORATION OF DELAWARE.

LIQUID METER.

Application filed March 16, 1927. Serial No. 175,703.

This invention relates to liquid meters, such as are adapted to be used, for example, in recording the quantity of water or oil that may be delivered by an oil well in the field.

The general object of the invention is to provide a simple and inexpensive device of the character mentioned, comprising but few parts, and so constructed as to insure reliability in constant operation.

Figure 1:
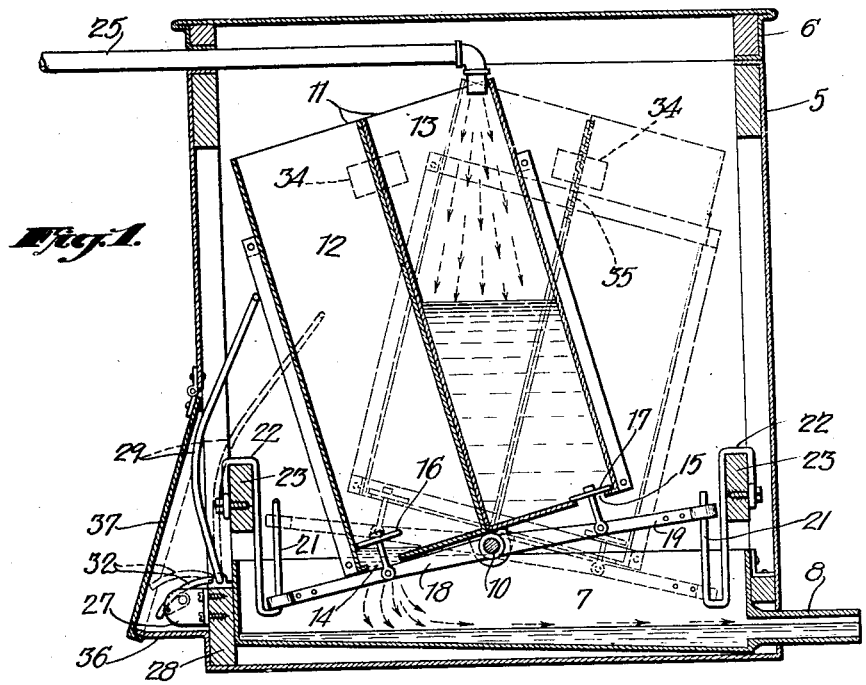
Figure 2:
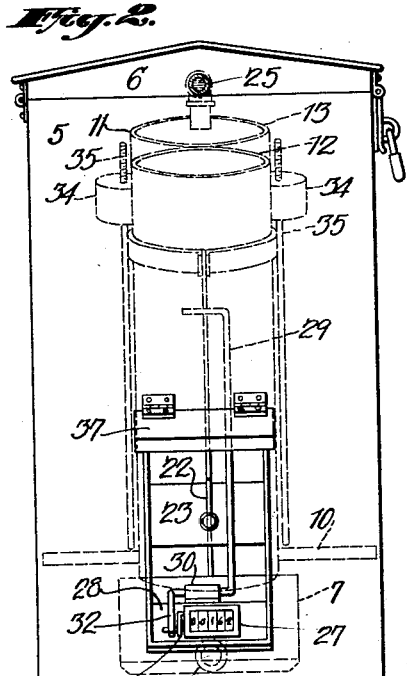
Figure 3:
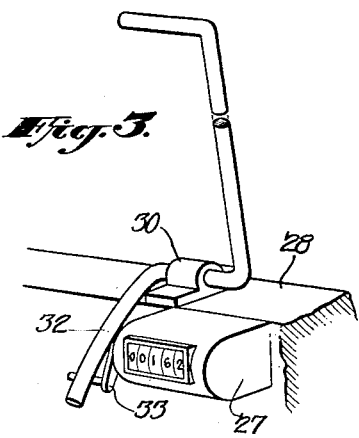

Other objects and advantages of the invention will become apparent from the following description, taken in connection with the accompanying drawings in which Figure 1 is a central, vertical sectional view through the apparatus; Figure 2 is an end view of the apparatus; and Figure 3 is a perspective view of the recording device for recording the number of cycles of operation of the apparatus.

While only one apparatus embodying this invention is herein shown and described, it will be understood that, in the case of oil wells where it may be desired to measure and record the quantity of both oil and water that a given well produces, two of such apparatus may be employed, one to take care of the oil and the other the water after these two fluids have been separated according to well known practice.

The apparatus, herein shown, preferably includes a housing 5 provided with a hinged or otherwise removable cover 6. Within the housing 5, a pan or other collection receptacle 7 is arranged, the receptacle being provided with an outlet 8 through which the liquid, which is periodically dumped into the pan, may be permitted to escape. Above this pan is journaled a shaft 10, to which is rigidly connected an oscillatory tank unit 11. This tank unit is made up of a pair of tanks 12 and 13, provided respectively with outlet openings 14 and 15, adapted to be opened and closed by means of valves 16 and 17, having their stems pivotally connected to arms 18 and 19, respectively, which are journaled upon the shaft 10. These arms 18 and 19 may be bent at their outer ends to provide loops adapted to receive upwardly projecting fingers 21, which serve as guides for the arms 18 and 19 and are carried by brackets 22 suitable connected to transverse frame members 23 arranged within the housing 5. The brackets 22 serve to limit downward movement of the arms 18 and 19, and these arms in turn serve to limit the oscillatory movement of the tank unit 11, since such tank unit is adapted to engage the arms 18 and 19, alternately as the valves 16 and 17 are opened.

Leading into the housing 5, is a pipe 25, the end of which is located immediately above the tank unit 11, so as to supply the liquid to be measured to the tanks 12 and 13 alternately.

In order to record the number of cycles of operation of the tank unit 11, a suitable recording device 27 is provided. This recording device is suitable attached to one of the frame members 28 of the housing 5, and is adapted to be intermittently actuated by means of a lever 29 suitably journaled, as at 30, to the frame member 28. This lever 29 is preferably curved intermediate its ends toward the tank unit 11 so as to engage the adjacent tank 12, whereby, as the tank unit moves from one position to another, a corresponding movement is imparted to a trip finger 32 which forms a part of the lever 29 and is adapted to actuate the operating lever 33 of the recording device 27.

In order to vary the movement of the tank unit 11, that is to say in order to predetermine the quantity of fluid which is required to move the tank unit 11 from one position to another, an adjustable weight 34 may be provided. the weight being carried by a screwthreaded arm or rod 35 rigidly attached to the shaft 10 or otherwise mounted so as to move with the tank unit 11.

The recording device 27 may be housed within an auxiliary housing 36 which projects from the main housing 5 and is provided with a hinge cover 37, the cover being adapted to be lifted in order to enable one to observe and note the reading of the recording device 27.

In operation, the liquid to be measured passes from the pipe 25 into one of the tanks of the measuring unit 11, say into the tank 13 while the measuring unit 11 is positioned as shown in full lines in Figure 1. In this position the valve 15 is closed, thereby preventing the liquid as it is introduced into the tank 13 from escaping. After a predetermined amount of liquid has been introduced into the tank 13, the weight of such liquid moves the tank unit 11 to its dotted line position, shown in Figure 1, and as a result of such movement, the arm 19, upon moving downward along the guide 21, strikes the bracket 22, and since the tank unit 11 continues to move until it is stopped by reason of its coming into contact with the arm 19, the valve 17 is opened and the liquid contained within the tank 13 is permitted to escape through the opening 15 into the receptacle 7. As the tank unit 11 swings from its full line position to its dotted line position shown in Figure 1, the valve 16 is closed and the upper end of the tank 12 is positioned directly beneath the outlet end of the pipe 25 so that liquid from the pipe 25 is directed into the tank 12. While the tank 12 is receiving liquid from the pipe 25, the liquid from the tank 13 is being discharged through the opening 15 into receptacle 7. After the liquid from the tank 13 has been released, and after a predetermined amount of liquid has been received by the tank 12, the tank unit 11 swings from its dotted line position to its full line position, due to the weight of the liquid which has been collected in the tank 12. As the tank unit 11 swings from its dotted line position to its full line position, the valve 16 is opened by reason of the fact that it is lifted from its seat in the same manner as described in connection with the valve 17, thereby permitting the contents of the tank 12 to escape through the opening 14 into the receptacle 7. For each cycle of operation of the tank unit 11, the lever 29 is so acted upon that the lever 33 is actuated to effect the desired recording by the recording device 27.

By the apparatus embodying the invention, it is possible to readily determine the amount of liquid which has been introduced into and released from the tank unit 11 during any given period, by first determining the number of cycles of operation performed by the tank unit 11 for that period and multiplying the number of such cycles by the units of liquid which the tank unit 11 receives for each cycle of operation, the amount of liquid being predetermined or fixed, as above explained, by the position to which the weight 34 has been adjusted.

What is claimed is:

1. A liquid meter comprising a tank unit, including a pair of tanks, each of said tanks having an outlet opening, a shaft supporting said unit for oscillatory movement thereon, a valve for each of said openings, an operating lever for each valve, each of said levers being pivotally connected to said shaft and adapted to move with said unit through a portion of its cycle of operation, and means for alternately obstructing the movement of said levers whereby said valves are alternately opened.

2. A liquid meter comprising a tank unit, including a pair of tanks, each of said tanks having an outlet opening, a shaft supporting said unit for oscillatory movement thereon, a valve for each of said openings, an operating lever for each valve, each of said levers being pivotally connected to said shaft and adapted to move with said unit through a portion of its cycle of operation, means for alternately obstructing the movement of said levers whereby said valves are alternately opened, and adjustable means for predetermining the amount of liquid required to effect the oscillatory movement of said unit, said adjustable means including an adjustable weight carried by said unit.

3. A liquid meter comprising an oscillatory tank unit including a pair of tanks, each of said tanks having an outlet opening, a valve for each of said tanks, an operating lever for each valve, each of said levers being adapted to move with said unit through a portion of its cycle of operation, means cooperating with the outer ends of said levers for guiding said levers in their respective paths of movement, and means for alternately obstructing the movement of said levers whereby said valves are alternately opened.

4. A liquid meter comprising an oscillatory tank unit including a pair of tanks, each of said tanks having an outlet opening, a valve for each of said tanks, an operating lever for each valve, each of said levers being adapted to move with said unit through a portion of its cycle of operation, means cooperating with the outer ends of said levers for guiding said levers in their respective paths of movement, and means for alternately obstructing the movement of said levers whereby said valves are alternately opened, the latter named means being in the form of brackets with which said guiding means are associated.

5. A liquid meter comprising an oscillatory tank unit including a pair of tanks, each of said tanks having an outlet opening, a valve for each of said openings, an operating lever for each valve, each of said levers being adapted to move with said unit through a portion of its cycle of operation, means for alternately obstructing the movement of said levers whereby said valves are alternately opened, a housing for said unit, and a receptacle arranged within said housing below said unit to receive the contents of said tanks as said valves are alternately opened.

6. A liquid meter comprising an oscillatory tank unit including a pair of tanks, each of said tanks having an outlet opening, a valve for each of said openings, an operating lever for each valve, each of said levers being adapted to move with said unit through a portion of its cycle of operation, means for alternately obstructing the movement of said levers whereby said valves are alternately opened, a recording device, and an operating lever for said recording device, said operating lever being adapted to slidably engage said unit and undergo movement from one position to another as said unit is oscillated.

In testimony whereof, we have affixed our signatures to this specification.

HARRY MOYER RYDER.
LEON J. BAILEY.